United States Patent Office 3,623,200
Patented Nov. 30, 1971

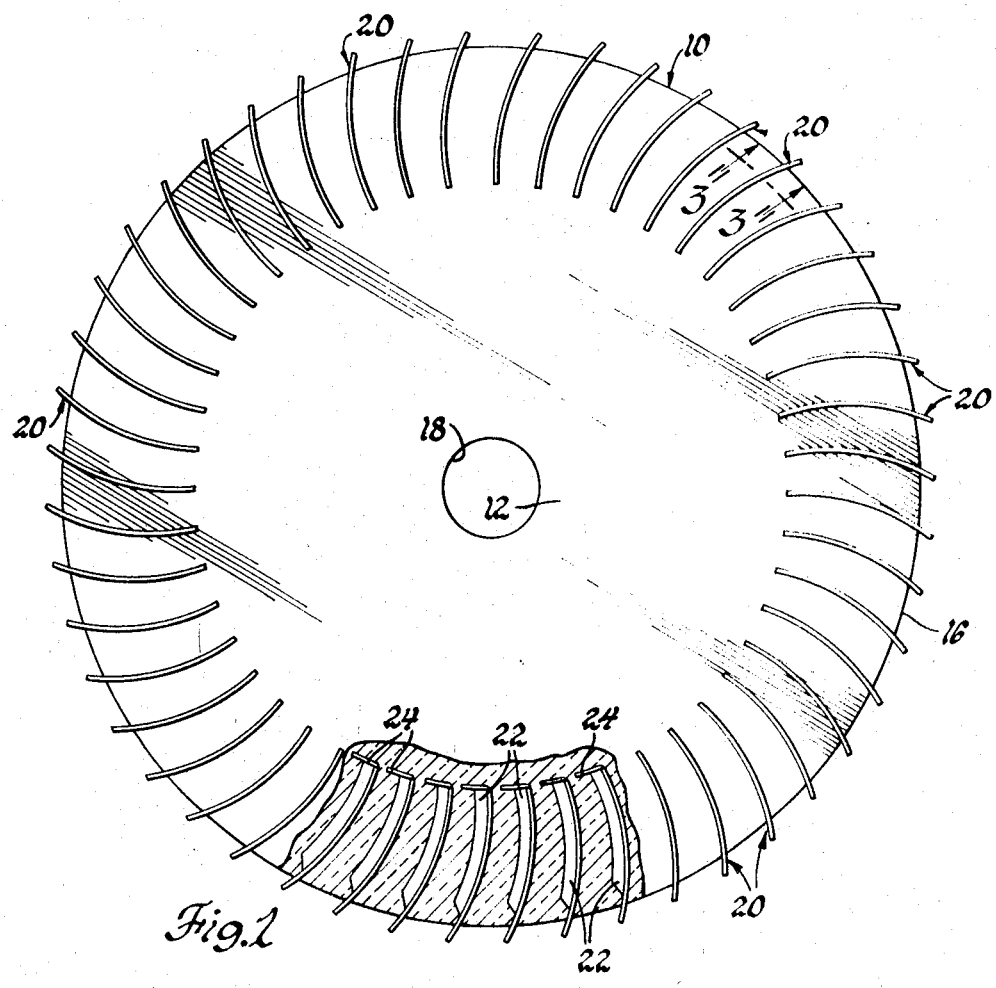
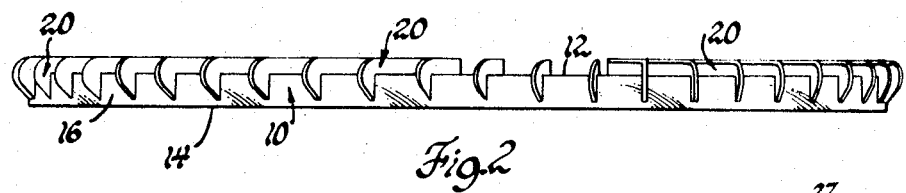
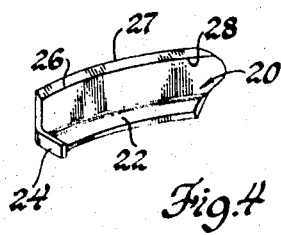
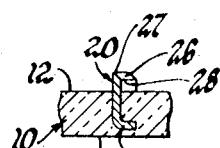
INVENTOR
Joseph Curcio

3,623,200
BLENDING DEVICE
Joseph Curcio, Southfield, Mich., assignor to General
Motors Corporation, Detroit, Mich.
Filed Mar. 30, 1970, Ser. No. 23,765
Int. Cl. B23d 71/00
U.S. Cl. 29—78                                    4 Claims

ABSTRACT OF THE DISCLOSURE

A rotary blending device for filler material including a support member with a plurality of cutter bits each having a blade. One form of the device includes a disc-shaped flexible support member having a plurality of cutter bits, each having an arcuate blade with a shearing face, spaced around the periphery of the support member. The device polishes the filler material on a surface while concurrently removing the excess filler in chip form.

---

This invention relates to an improved metal blending device and more particularly to an improved metal blending device for blending soft metallic fillers.

In the manufacture and assembly of automobile bodies, or the like, it is generally necessary to smoothly join body sections, including those having curved surfaces. A widely known method of joining body sections, including arcuate sections, to form one smooth continuous member includes coating the intersection therebetween, and the area adjacent thereto, with a soft metallic material. One such soft metallic material commonly used for this purpose is a solder composed of mainly lead and tin. This type of solder in a molten state functions as a filler. Any cracks or depressions in the surface in the vicinity of the intersection are accordingly filled with the solder. The excess solder can then be removed, and the soldered area smoothly polished forming a smooth continuous surface between the joined members. This polishing and solder removal is herein referred to as blending.

One prior art method of blending such a joint or intersection includes the use of a conventional abrasive disc. However, abrasive discs can create dust-like particles of the filler during this process which are not readily reclaimable. Moreover, the dust-like particles can create an undesirable environment in the immediate vicinity of the blending operation. This environment could deleteriously affect an unprotected operator. Accordingly, safeguards are generally provided to prevent the operator from being affected by the environment thus created. More specifically, operators are often required to wear elaborate protective apparatus including a hood. This protective apparatus can be cumbersome to wear and therefore often reduces the efficiency of the operator.

Moreover, a conventional abrasive disc can rapidly become coated with solder during the blending process. Therefore, these discs are frequently changed which can be both time consuming and costly. For example, the operator often has to remove part of his protective apparatus in order to facilitate replacing the abrasive disc.

Other prior art blending devices include those with blades rigidly mounted to a frame having auxiliary adjusting mechanisms such as springs or resilient rollers for contoured surfaces. These auxiliary adjusting mechanisms generally adjust the angle of the frame or support member with respect to the contoured surface. However, this can cause ditching of adjacent surfaces. Besides, for assembly line applications, it is usually desirable that a blending device be relatively simple with few auxiliary parts that can malfunction or clog. Moreover, simplicity of design, besides generally being more economical, can be particularly desirable in the environment created by the blending operation.

Further, blending, particularly when blending arcuate members, can be a very laborious and time consuming operation which requires a high degree of skill. For example, the usual prior art blending device must periodically be removed to inspect the surface finish. Accordingly, care must be exercised to avoid scraping or ditching the surrounding surfaces adjacent the interconnection when replacing the device.

Accordingly, the principal objects of this invention are to provide a metal blending device which does not produce a dust-like environment; to provide a metal blending device which removes the metallic filler in a readily reclaimable manner; to provide a blending device which does not become rapidly loaded with the filler particles; to provide a simple and economical blending device which does not require a highly skilled operator; and to provide a blending device which tends to inhibit ditching of adjacent surfaces.

These and other objects are generally accomplished by a rotary blending device having a support member with a plurality of separate cutter bits each having a blade with a free shearing face spaced around the periphery of the member. The blending device polishes and removes the metallic filler in the form of reclaimable chips. One form of this device includes a disc-shaped generally transparent flexible support member having a plurality of integrally molded brass cutter bits spaced around its periphery. The cutter bits each have an arcuate blade including a free shearing face and embedded restraining members.

Other objects, features and advantages of this invention will become more apparent from the following description of the preferred embodiment and from the drawings in which:

FIG. 1 is a partially broken away plan view of a metal blending device constructed in accordance with this invention;

FIG. 2 is an elevational view of the metal blending device constructed in accordance with this invention;

FIG. 3 is a sectional view taken along lines 3—3 of FIG. 1; and

FIG. 4 is an isometric view of a cutter bit forming part of the metal blending device constructed in accordance with this invention.

A metal blending device constituting one embodiment of this invention will herein be described in detail. Accordingly, attention is now directed to the figures, particularly to FIGS. 1 and 2, which show an integral blending device. The device includes a flexible generally transparent plastic support member 10 in the form of a disc. The disc-shaped member has a diameter of about 8 inches and is about .25 inch thick. The support member 10 includes a front surface 12, a back surface 14, a side surface 16 and a centrally located bore 18. Bore 18 has a centerline, not shown, generally perpendicular to the front and back surfaces on the member. The support member is preferably made of a soft pliable generally transparent urethane-type plastic which can be easily molded.

A plurality of generally identical brass cutter bits are integrally molded generally uniformly around the outer peripheral region of member 10. The corresponding parts of each bit ar angularly spaced about 7.5° apart. Each bit includes a blade portion 20 which is arcuate in longitudinal section, and a shoulder 22 and elongated tab 24 both which are integrally connected to the blade portion. Each arcuate blade portion has sides which protrude from front surface 12 generally perpendicularly and terminate in a free shearing face 26. Shearing face 26 has a leading edge 27 spaced about .20 inch from surface 12 and a trailing edge 28 spaced about .15 inch from surface 12.

The respective edges are termed leading and trailing with respect to the direction of rotation of the support member. Each shearing face 26 is about .06 inch wide and makes an angle of about 30° with the sides of its respective blade portion. The arcuate blade portions are generally uniformly arrayed around the outer 30% of the member with an outer section of each blade portion extending about .3 inch radially beyond side surface 16 of member 10. Shoulder 22 and tab 24, on the other hand, are completely within member 10.

As is best seen in FIG. 4, each blade portion has a circumferential length of about 1.5 inches, a thickness of about .025 inch, and a longitudinal radius of curvature of about 2.0 inches. Each tab, which projects about .25 inch generally perpendicular to the radius of curvature of its respective blade from an end thereof opposite the outer section, has a width of about .125 inch. Each shoulder, which is about .125 inch wide, extends from the tab to about the outer section of each blade portion adjacent and generally parallel to back surface 14. The outer section of each blade portion has an edge which is rounded adjacent shearing face 26 and generally straight adjacent shoulder 22 intersecting surface 16 at about an angle of 30°. It should be noted that if the critical relationships of the aforesaid dimensions are generally maintained, good results can generally be obtained for blending devices of other dimensions. For example, if the diameter of the support member is reduced to about 4 inches, the arcuate length of each blade portion could be about .75 inch with a radius of curvature of about 1.0 inch. A support member diameter of less than about 4 inches would be inefficient for most purposes. On the other hand, if the diameter of the support member is about 16 inches, the arcuate length of each blade should be about 3 inches and the radius of curvature about 4 inches. A support member diameter of greater than about 16 inches becomes cumbersome to use.

The operation of the blending device is generally as follows. The device is adaptable to be rotated about an axis generally coinciding with the centerline of bore 18 by a conventionally driven shaft, not shown, at a speed of about 3,000 r.p.m. It should be pointed out that since the support member is generally transparent, the operator can continually observe the surface to be blended. Further, since the support member is flexible the device can readily follow the contour of an arcuate body section. Continuing, the free shearing face of each blade portion removes the soft metallic filler in chip form. Not only are the chips reclaimable, but significantly, a dust-like environment of metallic particles is not created.

Accordingly, the cumbersome protective apparatus as previously recited is not required. Moreover, the blade portions, as described do not readily become coated with solder. In fact, what has been found has been that an arcuately shaped blade portion, such as generally provided, inhibits solder build-up on the device. Furthermore, it should be also noted that an angular spacing of about 7.5° between corresponding parts, as set forth, provides a sufficient number of blade portions to adequately polish the soldered surfaces. For example, 48 blade portions are provided in this embodiment. The spacing between corresponding parts varies from a minimum spacing of about .3 inch at the innermost radius of the blade on the support member to a maximum spacing of about .5 inch at their outermost radius. Of course, if a different chip size or a different type of finish is desired, a different spacing may be necessary. However, for adequate polishing, at least about eight separate cutter bits are generally required if the support member diameter is about 4 inches. On the other hand, more than about 120 separate cutters can even create a dust-like environment of filler particles on a support member having a diameter of about 16 inches. An excessive number of bits can also cause the blades and support member to become coated with the metallic filler. In fact, not more than about 72 cutter bits are preferred in the herein described embodiment.

Moreover, it should be further pointed out that although the blades are herein described as being made of brass, the invention is not so limited. For example, harder and more durable metallic substances such as a heat treated steel could be used. Of course, when using harder metallic blades of this type, care must be exercised in the blending operation to insure that the hard surface of the body sections are not damaged. Hence, brass is often preferred. However, the flexible support member tends to maintain the leading edge of the shearing face perpendicular to any contoured surface which minimizes ditching of the adjacent surface. On the other hand, the combination of the transparent support member and the softer blades can enable a relatively unskilled operator to do an adequate job of blending without the danger of excessive ditching or scraping.

What is claimed is as follows:

1. A rotary surface finishing device for blending filled regions on a metal surface which comprises a generally circular support member having a diameter of about 4 to 16 inches and having a major surface, about 8 to 120 spaced apart cutter bits embedded in said major surface of said support member, an arcuate blade portion on each of said bits having a radius of curvature of about 1.0 to 4.0 inches and an arcuate length of about .75 to 3 inches, each of said blade portions protruding generally perpendicularly from said major surface and extending radially beyond said support member about .15 to .6 inch, a free shearing face on each of said blade portions, integral locking members on said bit embedded in said support member, said blades being arrayed generally uniformly around said support member for removing excess filler material while concurrently polishing the filled region, and said support member being of a flexible generally transparent material which can generally follow the contours of curved surfaces while concurrently allowing the surface being finished to be viewed.

2. A rotary surface finishing device for blending filled regions on a metal surface which comprises a generally circular support member having a diameter of about 8 inches and having a major surface, about 36 to 72 spaced apart cutter bits embedded in said major surface of said support member, an arcuate blade portion on each of said bits having a radius of curvature of about 2.0 inches and an arcuate length of about 1.5 inches, each of said blade portions protruding generally perpendicularly from said major surface and extending radially beyond said support member about .3 inch, a free shearing face on each of said blade portions, integral locking members on said bit embedded in said support member, said blades being arrayed generally uniformly around said support member for removing excess filler material while concurrently polishing the filled region, and said support member being of a flexible generally transparent material which can generally follow the contours of curved surfaces while concurrently allowing the surface being finished to be viewed.

3. A nonloading rotary surface finishing device for blending filled regions of solder on a harder metal surface which comprises a generally plastic circular support member having a diameter of about 8 inches and having a major surface, about 48 spaced apart brass cutter bits embedded in said support member, an arcuate blade portion on each of said bits having a radius of curvature of about 2.0 inches and an arcuate length of about 1.5 inches, each of said blade portions protruding generally perpendicularly from said major surface and extending radially beyond said support member about .3 inch, a free shearing face on each of said blade portions having leading and trailing edges with respect to the direction of rotation of said circular support member, said leading edge being about .20 inch from said major surface, integral locking members on said bit embedded in said support member, said blades being arrayed generally uniformly arond the outer peripheral region of said support member for removing excess solder while concurrently polishing the solder filled region, and said support member being of a flexible generally transparent material which can generally follow the contours of curved surfaces while concurrently allowing the surface being finished to be viewed.

4. The nonloading rotary surface finishing device as recited in claim 3 wherein the arcuate blade portion on each of the cutter bits has a rounded end section for preventing ditching of surfaces adjacent the solder filled region.

References Cited
UNITED STATES PATENTS

| | | | |
|---|---|---|---|
| 2,183,082 | 12/1939 | Martaone | 29—78 |
| 2,367,597 | 1/1945 | Melbourne | 29—78 |
| 3,165,813 | 1/1965 | Harvell | 29—78 |

HARRISON L. HINSON, Primary Examiner